United States Patent [19]
Kobayashi et al.

[11] Patent Number: 5,218,669
[45] Date of Patent: Jun. 8, 1993

[54] VLSI HARDWARE IMPLEMENTED RULE-BASED EXPERT SYSTEM APPARATUS AND METHOD

[75] Inventors: Hideaki Kobayashi, Columbia, S.C.; Masahiro Shindo, Osaka, Japan

[73] Assignees: International Chip Corporation, Columbia, S.C.; Ricoh Company, Tokyo, Japan

[21] Appl. No.: 489,892

[22] Filed: Mar. 7, 1990

Related U.S. Application Data

[63] Continuation-in-part of Ser. No. 166,873, Mar. 11, 1988, abandoned.

[51] Int. Cl.$^5$ .............................................. G06F 15/18
[52] U.S. Cl. ......................................... 395/51; 395/52; 395/54; 395/11
[58] Field of Search ..................... 364/513; 395/51, 52, 395/54, 11

[56] References Cited

U.S. PATENT DOCUMENTS

| | | | |
|---|---|---|---|
| 4,628,435 | 12/1986 | Tashiro et al. | 364/513 |
| 4,648,044 | 3/1987 | Hardy et al. | 364/513 |
| 4,649,515 | 3/1987 | Thompson et al. | 364/513 |
| 4,748,439 | 5/1988 | Robinson et al. | 364/513 |
| 4,752,890 | 6/1988 | Natarajan et al. | 364/513 |
| 4,754,410 | 6/1988 | Leech et al. | 364/513 |
| 4,783,752 | 11/1988 | Kaplan et al. | 364/513 |
| 4,815,005 | 3/1989 | Oyanagi et al. | 364/513 |
| 4,839,822 | 6/1989 | Dormond et al. | 364/513 |

OTHER PUBLICATIONS

Crash Course in Artificial Intelligence and Expert Systems; Frenzel; Howard W. Sams & Co.; 1986; pp. 76–83.
Expert Systems; IEEE Potentials; Oct. 1986; Ann Miller; pp. 12–15.
An Intelligent Framework for Engineering Decision–Making; Stephen C-Y, Lu; Inter. Congress and Exposition, Detroit, MI; Feb. 1987; SAE Technical Paper Series.
AI Now More Realistically At Work in Industry; Control Engineering; Jul. 1989; Bartos; pp. 90–93.
The Use of expert systems in industrial control; Measurement and Control; vol. 17; Dec./Jan. 1984/5; Knight et al., pp. 409–413.
Robert H. Michaelson, et al., "The Technology of Expert Systems", Byte Magazine, Apr. 1985, pp. 303–312.
Beverly A. Thompson, et al., "Inside an Expert System", Byte Magazine, Apr. 1985, pp. 315–330.
Michael F. Deering, "Architectures for AI", Byte Magazine Apr. 1985, pp. 193–206.
Phillip Robinson, "The Sum: An AI Coprocessor", Byte Magazine, Jun. 1985, pp. 169–179.
Kenneth L. Short, "Microprocessors and Programmed Logic", Prentice-Hall, Inc., 1981.

Primary Examiner—Allen R. MacDonald
Attorney, Agent, or Firm—Bell, Seltzer, Park & Gibson

[57] ABSTRACT

The hardware-implemented rule-based expert system of this invention is suitable for performing high speed inferencing in artificial intelligence (AI) applications, and is characterized by being domain independent so that it can be applied to a variety of different application domains. The expert system includes a working memory in which, at the beginning of an inferencing operation, is stored known information or facts pertaining to the application domain. Additionally, a rule memory is provided for storing a rule set for the application domain. The rule set is comprised of a series of instructions, each defining a condition or an action. Instructions are successively loaded from the rule memory into via a first data bus. The logic unit successively executes the instructions in working memory with reference to the stored facts in working memory to thereby deduce new facts. The logic unit is coupled to working memory via a second data bus. During the inferencing operation, as new facts are deduced, they are stored in working memory and may be used for the execution of subsequent instructions. Upon the completion of the inferencing operation, an input/output interface transfers the facts stored in working memory to an output device.

47 Claims, 11 Drawing Sheets

VLSI HARDWARE IMPLEMENTED RULE-BASED EXPERT SYSTEM APPARATUS AND METHOD

CROSS REFERENCE TO RELATED APPLICATION

This application is a Continuation-in-Part of co-pending application Ser. No. 07/166,873 filed Mar. 11, 1988 abandoned.

FIELD AND BACKGROUND OF THE INVENTION

This invention relates to a rule-based expert system, and more particularly to a hardware implemented rule-based expert system suitable for performing high speed inferencing in artificial intelligence (AI) applications.

Expert systems are a class of computer programs that incorporate artificial intelligence (AI) technology to address problems normally thought to require human experts or specialists. In a rule-based expert system, expert knowledge in a particular application domain is represented in the form of a series of rules, "production rules". In the operation of a typical expert system the user, through a convenient user interface, supplies the expert system with certain known information about a particular problem, and the expert system applies the production rules to this known information to deduce facts and solve problems pertaining to the application domain. For further background information pertaining to expert systems, reference is made to the following articles: Robert H. Michaelsen, et al., "The Technology of Expert Systems", *Byte Magazine*, April 1985, pp. 308-312; Beverly A. Thompson, et al., "Inside an Expert System", *Byte Magazine*, April 1985, pp. 315-330; Michael F. Deering, "Architectures for AI", *Byte Magazine*, April 1985, pp. 193-206.

Successful expert systems have been developed for a number of application domains: for making medical diagnoses, for identifying organic compounds, for selecting oil drilling muds, and so forth. Additionally, a number of domain-independent expert system shells in software form have been developed to facilitate building rule-based expert systems for specific application domains. Several commercially available expert system tools are described in the above-noted articles. Typically, these expert systems and expert system tools are in the form of software programs designed to run on a general purpose computer or microcomputer. The software program provides an interactive session between the user and the expert system in which the expert system asks questions of the user and employs its expert knowledge base to solve problems and provide advice to the user.

There has been considerable interest in expanding the use of expert systems into other practical applications, and especially in developing expert systems capable of use in real-time applications. Such systems would be useful, for example as a control system for various applications, such as manufacturing processes, process control, guidance systems, robotics, etc. However, a major limitation in the development of complex, real-time AI systems is the speed of computation. In order to make effective practical use of artificial intelligence technology the efficiency and speed of computation must be increased.

Significant efforts have been made to improve the speed of AI processing by improving and streamlining the software tools used in AI processing, such as the AI languages. It has also been recognized that performance improvements can be achieved by custom designed hardware specifically engineered for artificial intelligence processing. As indicated in the Deering article noted above, one approach with respect to hardware architectural improvements has involved refinements in the processor's instruction set to allow the processor to operate more quickly. Attention has also been given to developing parallel processing architectures which would allow the AI computations to be carried out in parallelism. The article also notes that custom VLSI hardware could be employed to accelerate particular operations such as matching and fetching, parallel-processor communication and signal-to-symbol processing.

SUMMARY OF THE INVENTION

An important object of the present invention is to improve the speed and efficiency of rule-based expert systems by providing an inference engine which is implemented in hardware. More particularly, the present invention provides an application specific integrated circuit designed especially to perform high speed inferencing for a rule-based expert system.

The hardware-implemented rule-based expert system apparatus and method of the present invention is referred to herein by the acronym REX (Rule-based Expert), and includes a working memory in which, at the beginning of an inferencing operation, is stored known information or facts pertaining to the application domain. Additionally, the apparatus includes a rule memory for storing a rule set for the application domain. The working memory and rule memory are communicatively connected to the inference engine via physically separate first and second communications (data) busses, respectively. The rule set is comprised of a series of instructions, each defining a condition or an action. Means is provided for loading from the rule memory into the inference engine memory successive instructions of the rule set via the second communications bus. A logic means is provided in the inference engine for successively executing the instructions with reference to the stored facts in working memory obtained via the first communications bus. New facts are thereby deduced at high speed. During the inferencing operation, as new facts are deduced, they are stored in working memory via the first communications bus, and may be used during the execution of subsequent instructions of the rule set to derive additional facts. Upon the completion of the inferencing operation, the facts stored in working memory are transferred to an output device.

Each of the instructions of the rule set includes an operator, a condition/action flag, and a pair of operands. The logic means includes an instruction decoder for testing the condition/action flag of each instruction to determine whether the instruction is a condition or an action. If the instruction is a condition, the operands are compared in accordance with the logical operation specified by the operator to generate a logic result (e.g. true or false). If the instruction is an action, the action specified by the operator is performed on the operands.

The working memory and the logic means may be suitably provided in an integrated circuit. The rule memory may either be external to the integrated circuit and connected to the logic means via a suitable external memory bus, or the rule memory may also be provided on the integrated circuit with appropriate data bus interconnections with the logic means. In either case, separate busses are provided for connecting the working memory to the logic means and the rule memory to the logic means. Since the application rule set is stored in a memory device, the REX inference engine is domain independent and can be used in any number of different applications simply by installing a different application rule set in the rule memory. The structure of the rule memory and the data structure of the application rule set are designed to greatly enhance the efficiency of the inferencing process.

To illustrate the versatility and general wide applicability of the present invention, the detailed description which follows shows how the REX inference engine can be used as co-processor in conjunction with an existing computer or microcomputer to provide an expert system capable of performing inferencing at rates significantly greater than that which could be performed by conventional software implemented inference engines. The REX inference engine can also be utilized however, in many other applications, such as a stand-alone system when provided with an appropriate internal control system, user interface, and input/output devices.

The REX inference engine is capable of performing real-time knowledge processing based upon current VLSI technology. The speed of problem solving is measured by logical inferences per second (LIPS) instead of floating point operations per second (FLOPS). One LIPS is equivalent to approximately 100 to 1000 FLOPS on a conventional computer.

BRIEF DESCRIPTION OF THE DRAWINGS

Some of the features and advantages of the invention having been stated, others will become apparent from the detailed description which follows, and from the accompanying drawings, in which.

DETAILED DESCRIPTION

The present invention now will be described more fully hereinafter with reference to the accompanying drawings, in which an illustrative embodiment of the invention is shown. This invention can, however, be embodied in many different forms and should not be construed as limited to the embodiment set forth herein; rather, applicant provides this embodiment so that this disclosure will be thorough and complete, and will fully convey the scope of the invention to those skilled in the art.

Figure 1:
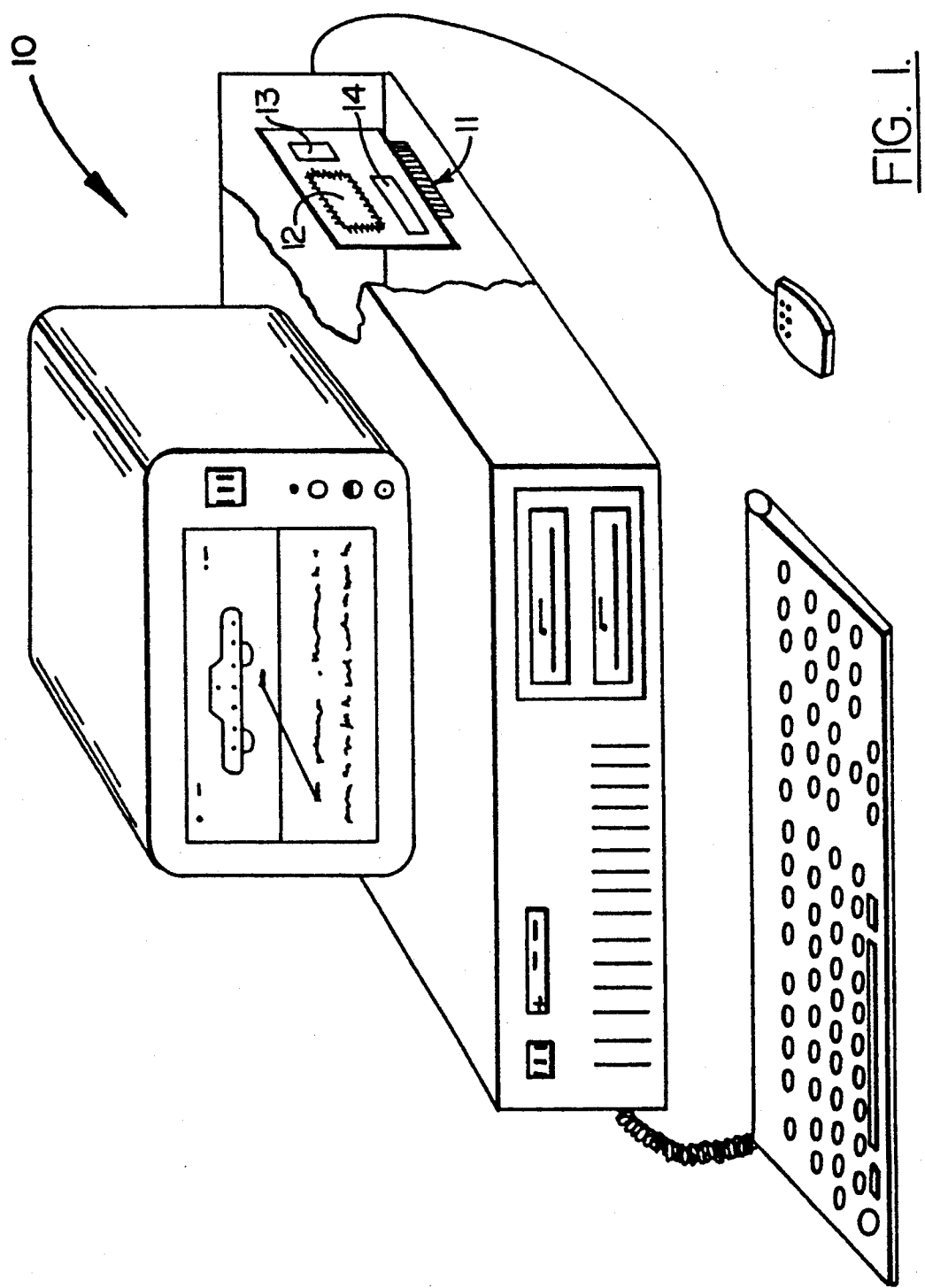
FIG. 1 is a perspective view illustrating how the REX inference engine of the present invention may be utilized as a co-processor in a conventional personal computer.
Figure 2:
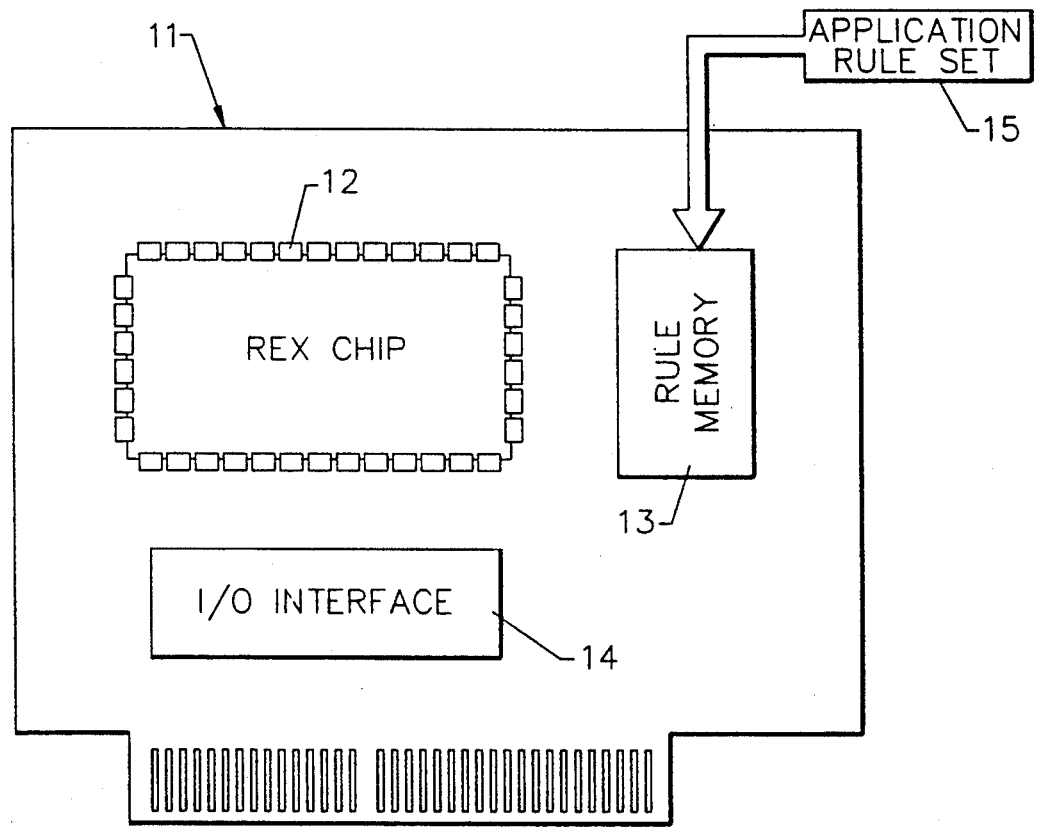
FIG. 2 is a more detailed view of a co-processor board employing the REX inference engine.

Referring now more particularly to the drawings, FIG. 1 illustrates an expert system in accordance with the present invention which is designed to operate on a microcomputer 10, such as an IBM AT Personal Computer with an added Rule-based Expert system (REX) co-processor board 11. The REX board 11 consists of a REX chip 12, external rule memory 13 and an I/O interface 14. The REX board is illustrated in FIG. 2 in greater detail. An application rule set for a particular application domain, indicated at 15 in FIG. 2, is stored in external rule memory 13. Thus, the REX chip 12 is domain independent and can be utilized in a variety of different applications.

Referring to FIG. 2, each component of the REX co-processor board 11 is explained as follows:

I/O Interface: The I/O interface 14 is responsible for the communication between the personal computer 10 and the REX co-processor board 11. External data is transferred from the personal computer 10 to the REX board 11 via the I/O interface 14. In the preferred embodiment illustrated herein, a DMA channel provides a communication link between the REX board 11 and the personal computer 10. A software program run by the personal computer is employed to provide an easily understandable user interface.

REX Chip: The REX chip 12 is a hardware inference engine and forms the heart of the REX co-processor board 11. Two major components of the REX chip are working memory and control logic. Before the inferencing process is begun, the working memory is initialized with external data from the I/O interface. External data pertaining to facts which are known about the application domain are stored in particular memory locations of the working memory. During the inferencing process, the working memory is a temporary storage for intermediate data. When the inferencing process is completed, the working memory contains the results of the inferencing process, which is then transferred to the personal computer via the I/O interface.

Rule Memory: The knowledge engineer extracts a set of production rules, called an application rule set 15, from the application domain and this rule set is stored in the rule memory 13. During the inferencing process, the REX chip 12 refers to rule memory 13 for rule information. The structure of the rule memory is well designed to match REX chip requirements and to reduce memory space. The data structure of the application rule set stored in rule memory is designed to greatly enhance the efficiency of the inferencing process. Further details about the structure of the rule memory and the application rule set stored therein are provided hereinafter.

The rule memory can be a ROM, RAM, EPROM, or other suitable memory device. If a RAM is used for rule memory, an initialization program is utilized to initially install the application rule set 15 in the external memory 13.

While the specific embodiment illustrated herein demonstrates how the REX chip 12 can be utilized as a co-processor for a personal computer, persons skilled in the art will recognize that the hardware-implemented rule-based expert system of the present invention (REX) can be utilized in many other specific applications. For example, it can be utilized as a stand-alone system. In such event, a control system is provided to handle user interface and I/O interface, and additional I/O devices such as a keyboard, graphics display, etc. are provided to permit communication between the REX board and the user.

Inferencing Mechanism

There are several types of inferencing methods that can be used to solve a problem in a rule-based expert system. Some of the major inference methods are forward chaining, backward chaining, and combination chaining. The inference engine specifically illustrated and described herein uses the forward chaining inferencing method or the backward chaining inferencing method with production rules. However, it will be understood by those having skill in the art that combination chaining and other inferencing methods, now known or developed in the future, may also be used.

The rules of the rule-based system are represented by production rules. The production rule consists of an *if* part and a *then* part. The *if* part is a list of one or more conditions or antecedents. The *then* part is a list of actions or consequents. Thus, a production rule can be represented as follows:

| if | condition__1, |
| | condition__2, |
| | . |
| | . |
| | condition__n |
| then | action__1, |
| | action__2, |
| | . |
| | . |
| | action__n |

If the conditions {condition__1, condition__2, . . . condition__n} satisfied by the facts of a given problem, we can say that the rule is triggered. The expert system can then execute the given actions. Once the actions are executed then the rules are said to be fired. These particular actions may change other conditions, which may in turn fire other rules. The flow of rules firing will continue until the problems are solved, or no other rules can be satisfied. This method of rule firing is moving forward through the rules, hence we call this forward chaining. Forward chaining is also referred to as a deduction system or facts driven because the facts guide the flow of the rules being fired.

The triggering of the rules does not mean that the rules are fired, because the conditions of several other rules may be satisfied simultaneously, and all being triggered. Should this happen, it is necessary to apply a conflict resolution strategy to decide which rule is actually fired. A conflict resolution strategy is a process of selecting the most favorable rule where more than one rule is satisfied. Examples of conflict resolution strategies are the following:

1. The rule containing the most recent data is selected. This strategy is called Data Recency Ordering.

2. The rule which has the most complex of the toughest requirements is selected. This is also called Context Limiting Strategy.

3. The rule declared first in the list is selected. This is called Rule Ordering.

EXAMPLE 1

Forward Chaining Example

This example provides a general illustration of the operation of a rule-based expert system. For this illustration, refer to the Animal Identification Rule Set in Appendix A. This rule set tries to identify an animal by giving its physical characteristics. Assume that the following characteristics have been observed:
the animal has hair,
the animal eats meat,
the animal has a tawny color,
the animal has black stripes.

These observations are translated into the following facts:
covering=hair,
food=meat,
color=tawny,
stripes=black.

Given these facts, RULE 1 is triggered. According to the rule, we deduce that
class=mammal
Now the system takes this as a new fact, that the animal is a mammal. Hence RULE 2 through RULE 4 cannot be triggered. The condition of RULE 5 is valid, thus the system will deduce that the animal is a carnivore.
carnivore=yes
So far, the system has deduced two new facts that can be used. The first three conditions of RULE 9 are true, but the last condition is not, thus RULE 9 failed. RULE 10 is triggered and can be fired. The system thus deduces that the animal is a tiger.
animal=tiger
The inferencing does not stop here, because there are more rules. In this case none of the other rules can be satisfied. The system identifies that the animal is a tiger.

The example shows the inferencing method by working forward from the current situation of facts or observations toward a conclusion.

EXAMPLE 2

Backward Chaining Example

This Example provides a general illustration of the operation of backward chaining in a rule based expert system. Because Rule Sets can be defined as a sequence of IF-THEN statements, one approach to solving Backward Chaining problems is to transform the Rule Set into a Forward Chaining structure. As described above, REX processes the IF component of an individual rule first and if all conditions are satisfied, all consequent actions are performed. In Backward Chaining problems, a goal (final) state is identified, and then all supporting rules are examined to see if the goal can be realized. This process involves testing if the action part of one rule is related to the condition part of another rule. When this process cannot proceed any further, the inferencing process pauses, asks for any missing information, and proceeds to prove or disprove the assumption (goal).

To implement this behavior, the original Rule Set must be transformed into a Backward Chaining version of the Rule Set. This process may occur during Rule Set compilation and requires the examination of rules to rearrange and reformat them into a backward representation.

The following Example 2 illustrates how a simple Forward Chaining problem is transformed into an IF- THEN expression of the corresponding Backward Chaining problem. The Rule Set is assumed to comprise the following rules:

| Rule 1: | IF A and B THEN D |
|---|---|
| Rule 2: | IF B THEN F |
| Rule 3: | IF A and C THEN E |
| Rule 4: | IF D and C THEN J |
| Rule 5: | IF D THEN H |
| Rule 6: | IF E THEN H |
| Rule 7: | IF F THEN G |
| Rule 8: | IF E and F THEN J |

G, H and J are goals or conclusions to be determined by the expert system. Accordingly, for Backward Chaining, the goals of G, H and J are identified. The goals are successively assumed to be TRUE (indicated by a "prime" symbol such as G') and the supporting rules are examined to determine which facts are necessary for the goal to be TRUE. If the facts are present, then it is assumed the goal is TRUE. If not the goal is FALSE. For example, the following inferencing sequence occurs for G:

| Assume G': | |
|---|---|
| IF G' THEN F' | (Rule 7) |
| IF F' THEN ask (B) | (Rule 2) |
| IF B THEN G. | |

In other words, if B is TRUE then the assumption made about G was correct.

The following inferencing sequences occur for H:

| Assume H': | |
|---|---|
| (1) IF H' THEN E' | (Rule 6) |
| IF E' THEN ask (A), ask (C) | (Rule 3) |
| IF A and C THEN H. | |
| (2) IF H' THEN D' | (Rule 5) |
| IF D' THEN ask (A), ask (B) | (Rule 1) |
| IF A and B THEN H. | |

The two Backward Chaining inferencing sequence will produce the goal of H if either A and B is TRUE or A and C is TRUE.

The following inferencing sequences occur for J:

| Assume J' | |
|---|---|
| (1) IF J' THEN D', ask (C) | (Rule 4) |
| IF D' THEN ask (A), ask (B) | (Rule 1) |
| IF A and B and C THEN J. | |
| (2) IF J' THEN E' and F' | (Rule 8) |
| IF E' THEN ask (A), ask (C) | (Rule 3) |
| IF A and C THEN E | (Rule 3) |
| IF F' THEN ask (B) | (Rule 2) |
| IF B THEN J. | |

The two Backward Chaining sequences will produce the goal of J if A and B and C is TRUE.

It will be understood by those having skill in the art that a combination of forward and backward chaining may also be used.

REX Inference Engine Architecture

Figure 3:
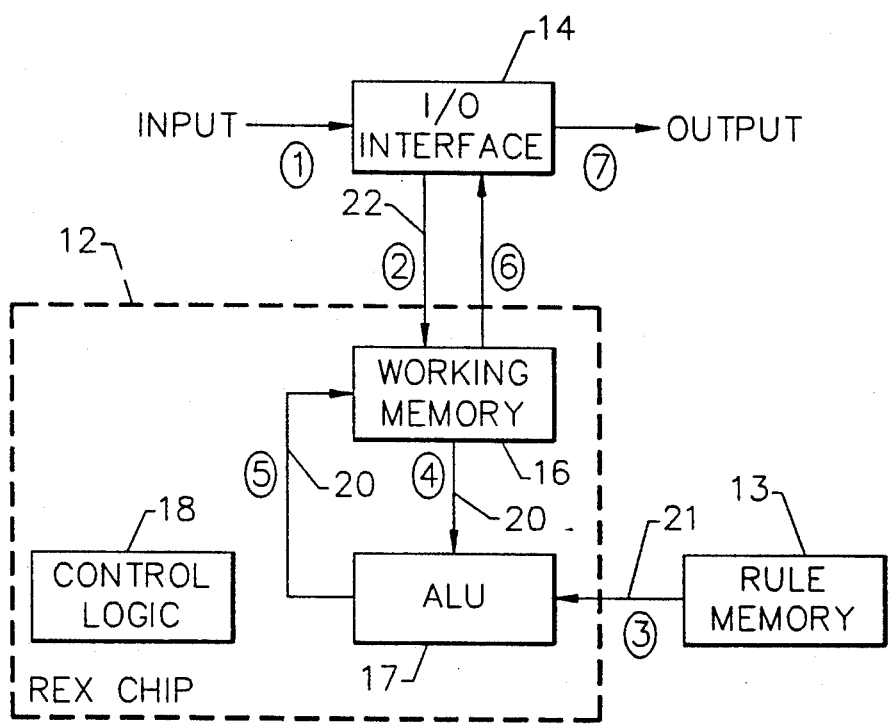
FIG. 3 is a block schematic diagram showing the data flow for the REX engine.

The major components of the REX inference engine are shown in greater detail in FIG. 3. The REX chip itself has three primary functional components: the working memory 16, an arithmetic logic unit (ALU) 17 and control logic 18. A first data bus 20 is provided for bidirectional communication between working memory 16 and ALU 17. In the embodiment illustrated herein, the rule memory 13 is a separate memory device connected to the ALU 17 by a second data bus 21. However, those skilled in the art will recognize that the rule memory could, if desired, be integrated into the REX chip itself provided that a data bus 21 connecting rule memory 13 and ALU 17 is provided, with data bus 21 being physically distinct from data bus 20. The I/O interface 14 is communicatively connected to the working memory by a system interface bus, generally indicated at 22. The control logic is schematically represented in FIG. 3 and indicated by the reference character 18. In general, the function of the control logic 18 is to control the operations of the other elements, such as the ALU 17 and working memory 16.

Data Flow in the REX Inference Engine

The flow of data for the REX engine will be best understood from FIG. 3 and the description which follows. The circled numbers in FIG. 3 correspond to the following numbered topic headings:

1. Input Data

The user inputs the facts to the system through a user interface program on the personal computer 10. The user presents the facts in a predefined syntax. For instance, using the factual data of the Example 1 and the Rule Set of Appendix A, the user would enter the following:

```
covering = hair
color = tawny
...
... etc.
```

The user interface program converts each factual observation into a values represented by a pair of binary numbers. The first part of the pair is an address and the second part of the pair is a value.

| Address | Value |

In the above example we have

```
(address $32)covering = (value#10)hair,
(address $58)color = (value #55)tawny.
...
... etc.
``` where, "$" and "#" indicate that the number referred to is an address and a value, respectively. In the above case covering is mapped to address 32 (no other word maps address 32). Thus each word is assigned to a unique address number. The value hair is stored in address 32. These numbers are used in Step 2.

2. Store Facts into Working Memory

In Step 2 the facts are stored in Working Memory.

3. Fetch Rules into ALU

External Rule Memory 13 is used to store rules pertinent to the application domain. Each rule is represented as follows:

```
IF
    condition 1 and
    condition 2 and
    ...
THEN
    action 1
    action 2
    ...
```

A condition element is
  (class=mammal)
Similarly an action element is:
  (type=ungulate)
Each element, whether condition or action part of the rule, is represented internally as an instruction in the format shown below:

| Operand1 | Operand2 | Operator | Dir/Imme | Act/Cond |

Each instruction is of a predetermined length, for example 32 bits. Operand1 represents an address of Working Memory. Depending on the value of Dir/Imme field, Operand2 is either an address or a value in the Working Memory. Dir/Imme field specifies whether the addressing mode of Operand2 is Direct or Immediate. The Act/Cond field specifies whether the element refers to condition or action part of a rule. The Operator field specifies the type of operator used in the condition part of the rule. Example operators are : equal to (=), greater than (>), less than (<), etc.

4-5 Inferencing Cycle

The following steps are executed during the inferencing cycle.

4.1 Fetch External Memory Element

A rule is fetched from Rule Memory 13 and the Cond/Act field of the first instruction of the rule is examined to check if it is a condition or an action. If the instruction is a condition element, then the procedure described in Section 4.1.1 is used. If it is an action, then the procedure described in Section 4.1.2 is used.

4.1.1 Matching Rule Condition Element to Working Memory

The address in Operand1 is loaded into ALU (Step 4). Next the Dir/Imme field is checked to see if Operand2 is Direct or Immediate. If it is immediate, then the value of Operand2 is directly input to ALU, otherwise the contents of the address pointed by Operand2 is input to ALU. The inputs to ALU are compared by the ALU using the operator (Operator field) to determine whether the condition is true or false. If the condition is true, the next successive instruction of the rule is examined by repeating the sequence of steps indicated in section 4.1. If the condition element is false, then this rule is discarded and the next rule is tested by repeating the sequence of steps in Section 4.1.

4.1.2. Action Part

The Dir/Imme flag of the action element is first checked. If it is Direct, then the value stored at Working Memory location Operand2 is copied to the Working Memory address represented by Operand1. If Dir/Imme flag is Immediate, then Operand2 is copied to the Working Memory address represented by Operand1. After performing the action defined by the instruction, the next successive action instruction of the rule is read and the procedure described in Section 4.1.2 is repeated. If action instruction is the last instruction of the rule then, next rule is tested by repeating the sequence of steps in Section 4.1.

6. Facts to Data

After all the rules have been processed, the control is transferred to the I/O interface 14. The numerical representation of the facts is translated to a form which will be readily understood to the user.

7. Data Output

The I/O interface will then output the data to the personal computer 10.

EXAMPLE 3

REX Data Flow Example

This example illustrates how the REX chip solves the problem described above in Example 1. Again, the numbered topic headings correspond to the circled numbers in FIG. 3. Refer to Appendix A for the complete Animal Identification Rule Set.

1. Input External Data

The data or observation made is:
the animal has hair,
the animal eats meat,
the animal has a tawny color,
the animal has black stripes.
The above data enters I/O interface and is translated into facts. The data is translated into the following facts:
  (address $32) covering=(value #10) hair,
  (address $41) food=(value #3) meat,
  (address $58) color=(value #55) tawny,
  (address $35) stripes=(value #8) black.

2. Store Facts in working Memory

The address represents the location in Working Memory. For example, address location 32 stores the value of 10.

3. Load Instruction

An instruction is loaded in ALU from Rule Memory. The first instruction of RULE 1 is a condition, and takes the form of:
  (address $32) covering EQUAL (value #10) hair

4. Load Operands a. Condition
The value of address location 32 is loaded into ALU, in this case 10. The comparison operation of ALU is:
  (value #10) hair EQUAL (value #10) hair
This result is true
If the instruction is:
  (address $32) covering EQUAL (value #11) feathers,
the output of ALU will be false. The control returns to STEP 3.
b. Action
If the instruction is an action such as:
  (address $77) class MOV (value #20) mammal ALU will get the value 20 and will store it at the address location 77.

5. Store Facts in Working Memory

The value of 20 is deduced from RULE 1 and is instructed to be stored at address location 77. The control returns to STEP 3.

6. Facts to Data

In this example the value at the (address $88) class is transferred to I/O interface. From the facts, the value at address location 88 is (value #100) tiger.

7. Data Output

The value 100 is translated by the interface to tiger.

Rule Base Structure

The application rule set 15 which is stored in working memory 16 is divided into two parts—STRUCT and RULES. A set of conditions in each rule is grouped together in adjacent addresses. Also, a set of actions in each rule is grouped together in adjacent addresses. These groups can be stored in the RULES part of working memory in the following fashion:

```
Rule #1
    address xxx1      condition_1_1
    address xxx2      condition_1_2
         .                 .
         .                 .
         .                 .
    address xxxm      condition_1_m
    address yyy1      action_1_1
    address yyy2      action_1_2
         .                 .
    1    .                 .
Rule #2
    address zzz1      condition_2_1
         .                 .
         .                 .
         .                 .
```

Since conditions and actions are sequentially stored in different memory addresses, the representation of rules can be structured by using the starting address of each rule. Thus, the production rule can be expressed as:

```
        if      xxx1
        then    yyy1
        if      zzz1
        then    ...
```

This format shows that if a group of conditions at a certain address is TRUE, then execute the group of actions at the address specified in then-part. Now, if the first rule fails then the control mechanism jumps to the starting address of the next rule. There is no need of the end-indicators for each rule, hence REX does not waste time on searching end-indicators.

Figure 4:
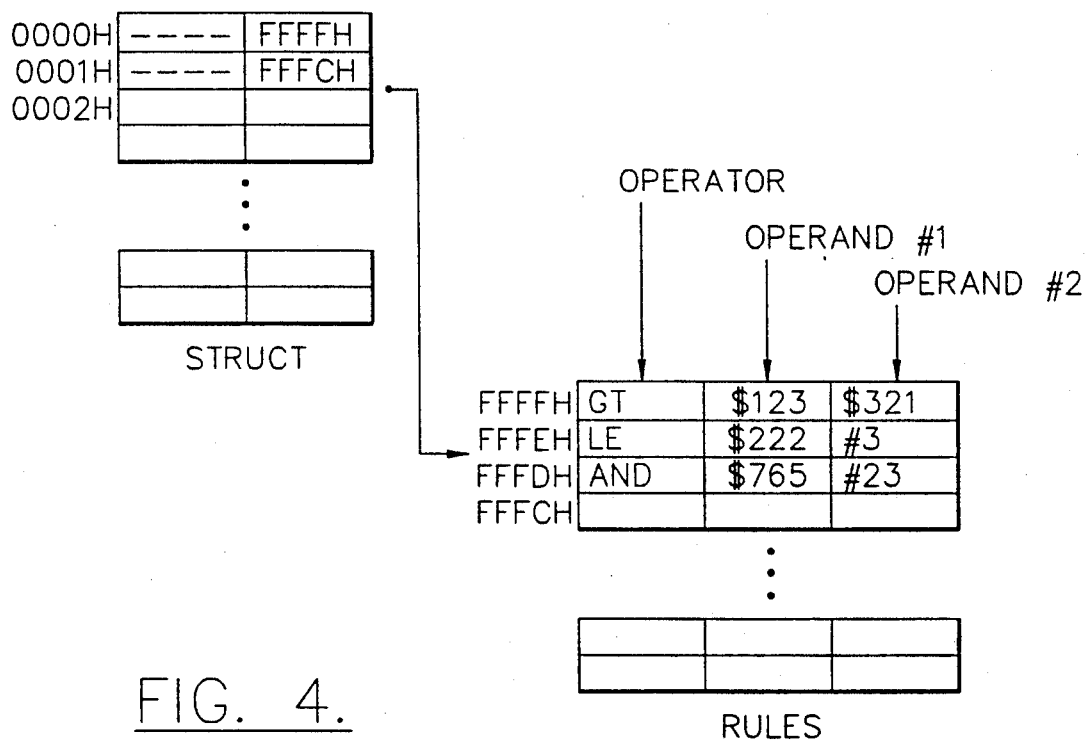
FIG. 4 is a block diagram illustrating the rule base structure for the REX engine.

Rule Base Structure of REX is illustrated in FIG. 4. For this version, External Memory of 64K×32 ROM is used to store the Application Rule Set 15. To maximize the utilization of limited memory, STRUCT and RULES are stored at both ends of Rule Memory 13, respectively. STRUCT starts from address 0000H and increases. RULES starts from address FFFFH and decreases.

Figure 5A:
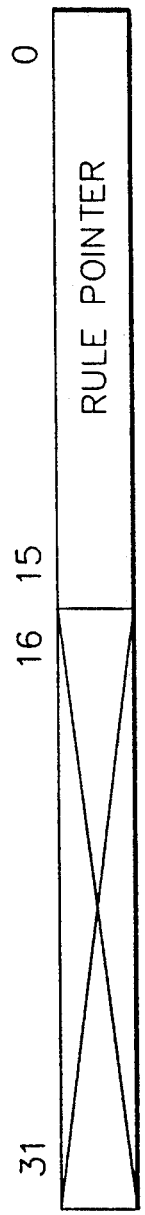
FIG. 5a and 5b are is a diagram showing the data structure of the instructions which are stored in rule memory.

The detailed structure of Rule Memory is shown in FIG. 5. STRUCT stores the address index which points to the starting address of each rule in RULES. The size of Rule Memory is 64K, so only 16-bit lower-half word is used.

Each condition or action is represented as a 32-bit word instruction executed by REX. The condition is basically a logical comparison of two given operands. The actions are organized in a similar fashion. The operators of the actions are basically logic operators and an assignment operator. There are two operands for each operation: operand1 and operand2. Operand2 can be of two forms: direct or immediate. As shown in FIG. 4, the direct operand is a pointer to an address in the working memory represented by the symbol '$' and the immediate operand is an integer represented by '#'.

Instruction Set for REX Inference Engine

Figure 5B:

As shown in FIG. 5(b), instructions of REX are always 32-bit long. The Operation Code (6 bits), OP1 13 bits), and OP2 (13 bits) are assembled into one 32-bit instruction. Each rule in a given Application Rule Set has condition and action parts. Therefore, REX has two types of instruction set:

Condition Instructions: This type of instruction is used to check if the condition is True or False. This allows users to specify different logic relations between two operands, such as "Equal", "Greater Than", etc. The execution result of an Condition Instruction can only be True or False, which will affect the next execution sequence.

Action Instructions: This type of instruction is executed only when all the conditions of the current rule are True. The result of the execution of the action is always stored in the first operand.

The instruction and the corresponding operation codes are summarized in Table 1.

TABLE 1

| REX OPERATION CODES | | |
|---|---|---|
| Operation Codes | Operation | Description |
| 0X0000 | EQ | Equal To; Is operand1 = operand2 ? |
| 0X0001 | NE | Not Equal to; Is operand1 <> operand2 ? |
| 0X0010 | GT | Greater Than; Is operand1 > operand2 ? |
| 0X0011 | LT | Less Than; Is operand1 <= operand2 ? |
| 0X0100 | GE | Greater than or Equal to; Is operand1 >= operand 2 ? |
| 0X0101 | LE | Less than or Equal to; Is operand1 <= operand2? |
| 1X0000 | NOT | logic NOT operand1; Each bit of the operand1 is complemented and the result is stored in operand1 in Working Memory |
| 1X0001 | AND | logic AND operand1 and operand2; Logic AND operation is performed on the correspondent bits of the operand1 and operand2. The result is stored in operand1 in Working Memory. |
| 1X0010 | OR | logic OR operand1 and operand2; Logic OR operation is performed on the correspondent bits of operand1 and operand2. The result is stored in operand1 in Working Memory. |
| 1X0011 | MOV | MOVe operand2 to operand1; The content of the operand2 is stored in operand1 in Working Memory. |

TABLE 1-continued
REX OPERATION CODES

| Operation Codes | Operation | Description |
|---|---|---|
| 1X0100 | SHR | SHift operand1 Right 1 bit; The least significant bit is discard and a zero is shifted into the most significant bit; the result is stored in operand1 in Working Memory. |
| 1X0101 | SHL | SHift operand1 Left 1 bits; The most significant bit is discard and a zero is shifted into the least significant bit; the result is stored in operand1 in Working Memory. |
| XX0110 | JMP | JuMP to new address of External Memory; For JMP instruction, the least significant 16 bits of the instruction is loaded to C1 register which points to the new rule in External Memory. |
| XX0111 | EOR | End of External Memory. | operand1 is direct-addressed data (WM[OP1]) from Working Memory.
operand2 can be direct-addressed data (WM[OP2]) or an immediate data (OP2).

Figure 6:
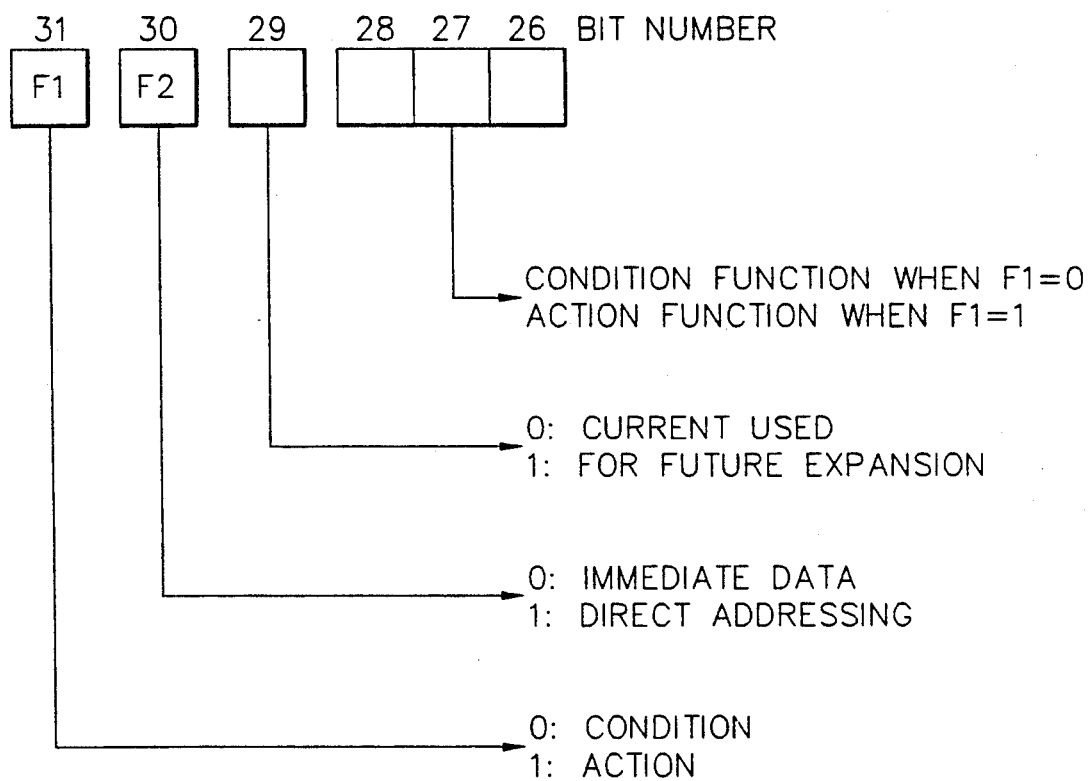
FIG. 6 is a diagram illustrating the operation codes format used in the REX chip.

The format of the opcode is displayed in FIG. 6. MSB (most Significant Bit), i.e. F1, of the opcode is used to specify the type of the instruction. If F1 is 0, it is a Condition instruction; otherwise it is an Action instruction.

A Condition instruction always has two operands. Whereas, an Action instruction may have only one or two operands depending on the operation needs.

REX allows two types of addressing mode: immediate and direct addressing. First operand always uses direct addressing mode. The second operand can be an immediate data or direct-addressed data. The addressing mode is distinguished by checking second MSB, i.e. F2, of the operation code. When F2 is 0, second operand is an immediate data. Otherwise, the second operand is a direct-addressed data.

Functional Description of the REX Chip

Figure 7:
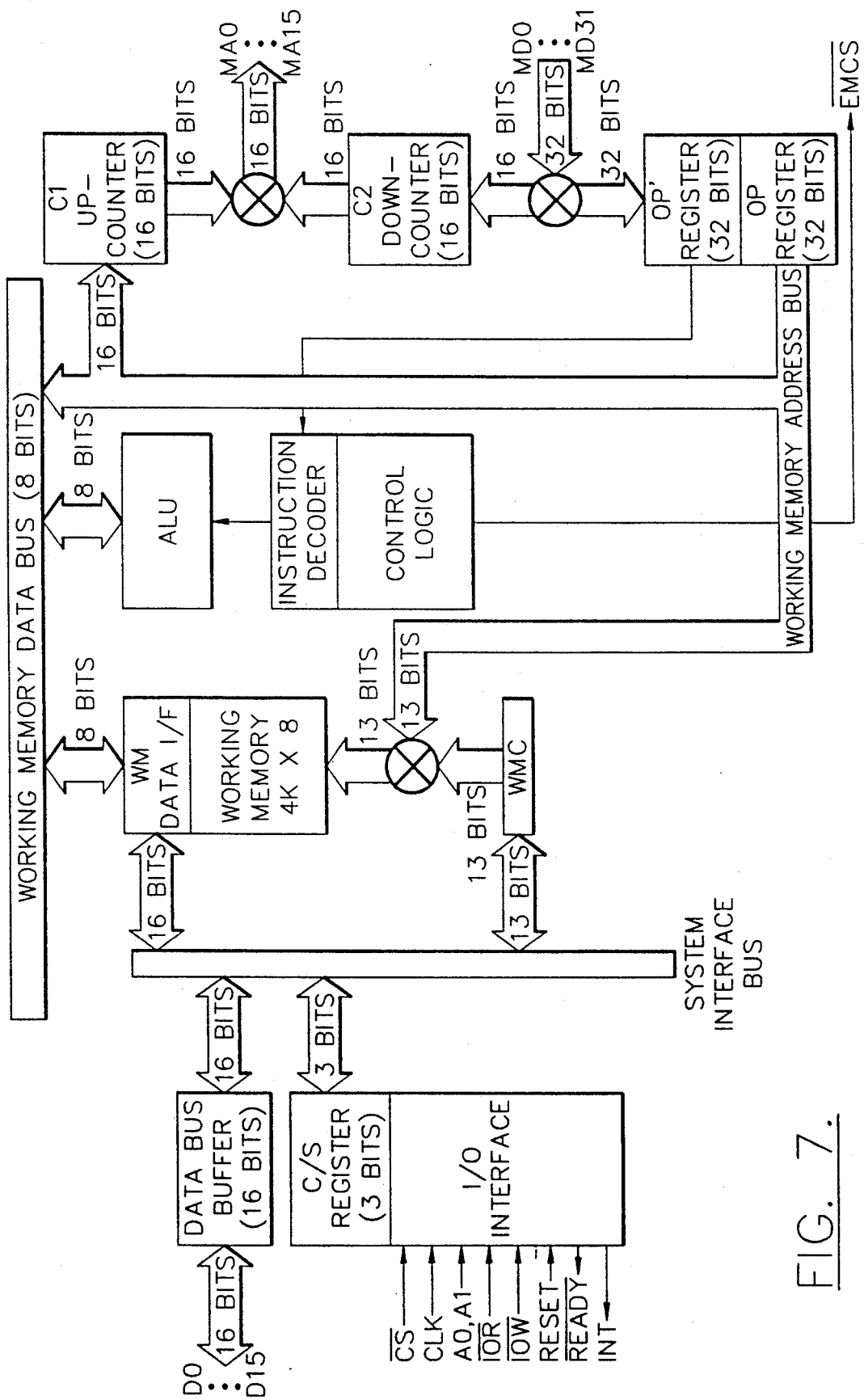
FIG. 7 is an overall block diagram of the major functional components of the REX chip.

FIG. 7 provides a detailed block diagram of the REX chip 12. To avoid repetitive description, elements which have been previously described in connection with earlier drawing figures will be identified with the same reference characters.

Table 2 below lists the name, I/O type, and function of each input and output illustrated in FIG. 7.

TABLE 2
PIN DESCRIPTION OF REX

| Symbol | Type | Name and Function |
|---|---|---|
| CLK | I | Clock Input: CLK controls the internal operations of REX chip. The maximum clock rate is 8 MHz. |
| $\overline{CS}$ | I | Chip Select: Chip Select is an active low input used to select REX chip as an I/O device when CPU wants to read/write REX chip's internal registers (WM, WMC, C/S). |
| $\overline{EMCS}$ | O | External Memory Chip Select: $\overline{EMCS}$ is low active. When REX is in inferencing mode, $\overline{EMCS}$ is used to select External Memory for information of the rule. |
| $\overline{IOR}$ | I | I/O Read: $\overline{IOR}$ is low active. When both $\overline{CS}$ and $\overline{IOR}$ are active, CPU has read access to REX chip's internal registers (WM, WMC, C/S). |
| $\overline{IOW}$ | I | I/O Write: $\overline{IOW}$ is low active. When both $\overline{CS}$ and $\overline{IOW}$ are active, CPU has write access to REX's internal registers (WM, WMC, C/S). |
| $\overline{READY}$ | O | Ready: $\overline{READY}$ is low active. $\overline{READY}$ is a synchronization signal for external data transfer. $\overline{READY}$ goes low when REX is ready for new data. |
| RESET | I | Reset: RESET is high active. RESET is used to initialize REX chip state. All registers are reset after RESET is activated. |
| INT | O | INTerrupt Request: INT is high active. REX chip uses INT to interrupt CPU when REX chip finished the inferencing process. |
| A0–A1 | I | Address: The two least significant address lines are used by CPU to control the data transfer to REX chip's internal registers (WM, WMC, C/S). |
| D0–D15 | I/O | Data Bus: Data Bus lines are bidirectional three-state signals connected to system data bus. The Data Bus are output signals when $\overline{IOR}$ is active. The Data Bus are input signals when $\overline{IOW}$ is active. |
| MA0–MA15 | O | External Memory Address Bus: When REX chip is in inferencing mode, External Memory Address Bus is used to address a rule in External Memory. |
| MD0–MD31 | I | External Memory Data Bus: When REX chip is in inferencing mode, External Memory Data Bus sent the information regarding each rule to the REX chip. |

WM: Working Memory
WMC: Working Memory Counter register
C/S: Control/Status flag registers The identification of each register, and the function of each is as follows:

WM (Working Memory): Working Memory 16 is used to store the intermediate data during the inferencing process. Before REX starts the inferencing process, Working Memory is loaded with facts from user's input. The size of Working Memory limits the amount of user inputs to REX at any one time. In the illustrated embodiment, working Memory is a 4K×8 Static RAM.

WMC (Working Memory Counter) Register: WMC is an 13-bit increment counter with the capability of parallel load. During the I/O mode, WMC is used as Working Memory address counter for data transfer. When data transfer is proceeding, WMC will increment automatically. The content of WMC can be set by CPU before data transfer starts.

C1 Register: C1 is an 16-bit increment counter with the capability of parallel load. During the inferencing process, C1 points to one of the rules addresses in the STRUCT part of the Rule Memory 13. C1 increments by one before REX goes to the next rule. For JMP instruction, C1 will be loaded with a new value instead of incrementing by one.

C2 Register: C2 is an 16-bit decrement counter with the capability of parallel load. C2 points to the RULES part of Rule Memory. If no false condition occurs in a rule, C2 decrements by one before REX goes to the next condition or action. When a false condition of a rule is detected, C2 will be loaded with the starting address of the next rule instead of decrementing by one.

OP Register: OP Register contains three parts: Operation Code, OP1, and OP2, which comprise an REX instruction. Operation Code is a 6-bit register that stores the operator of an instruction. Both OP1 and OP2 are 13-bit data registers that store the address of operand1 and operand2 in Working Memory respectively.

OP' Register: OP' Register is a prefetch Register used to store the prefetch instruction for OP Register. REX will execute the prefetch instruction except that when an JMP Instruction or a false condition occur.

SI (Start/Idle) Control Flag: SI is used to identify REX operation status: Inferencing Mode and I/O Mode. SI is set by CPU after the system sent all the facts to Working Memory. SI has the value 1 during the Inferencing Mode. SI is reset by REX each time the inferencing process stops, then REX switches to I/O Mode.

IE (Interrupt Enable) Control Flag: IE is set by CPU at the same time with SI flag. REX is granted the interrupt enable before REX goes to inferencing mode. IE is used with IRQ flag to generate interrupt signal. IE flag is reset by CPU at the end of the interrupt service routine.

IRQ (interrupt ReQuest) Status Flag: When inferencing process stops, IRQ is set by REX to indicate that REX is requesting an interrupt to CPU. IRQ is and-gated with IE flags to generate interrupt signal INT. IRQ is reset by CPU after the interrupt is acknowledged.

When REX is in I/O Mode, CPU can read or write REX registers. The signals and affected registers are listed in Table 3.

TABLE 3
DEFINITION OF REGISTER CODES

| Register Operation | $\overline{CS}$ | $\overline{IOW}$ | $\overline{IOR}$ | A1 | A0 |
|---|---|---|---|---|---|
| Read Status Registers | 0 | 1 | 0 | 0 | 0 |
| Write Control Registers | 0 | 0 | 1 | 0 | 0 |
| Read Working Memory Counter | 0 | 1 | 0 | 0 | 1 |
| Write Working Memory Counter | 0 | 0 | 1 | 0 | 1 |
| Read Working Memory | 0 | 1 | 0 | 1 | 0 |
| Write Working Memory | 0 | 0 | 1 | 1 | 0 |
| REX Chip is Not Selected | 1 | X | X | X | X |

Operational Modes

REX has two operation modes:
I/O Mode
Inferencing Mode

Control flag SI is used as a mode flag. REX switches to the other mode when SI flag is changed.

Before REX get into Inferencing Mode, REX has to load all the user-input facts from the host system into Working Memory of REX. REX is switched from I/O Mode to Inferencing Mode when SI flag is set by host.

After the inferencing process is terminated, the results will be transferred from Working Memory to the host system.

Figure 8:
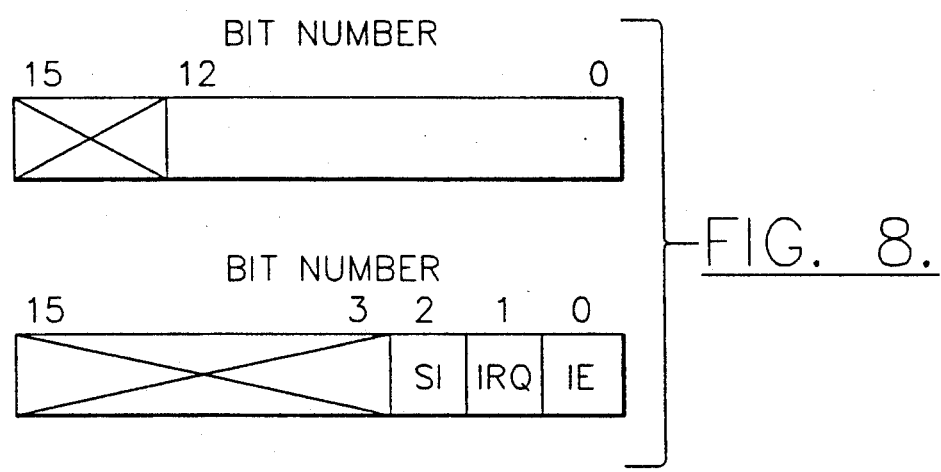
FIG. 8 is a diagram illustrating the data bus bit assignment for I/O read/write operations.

During the I/O operation, the host system can read or write specific registers when REX chip is selected. The control of read/write operations and the selection of registers are controlled by a set of control lines which are listed in Table 3. During reading and writing of WMC and C/S registers, only some bits of the system data bus are used. This is illustrated in FIG. 8.

Figure 9:
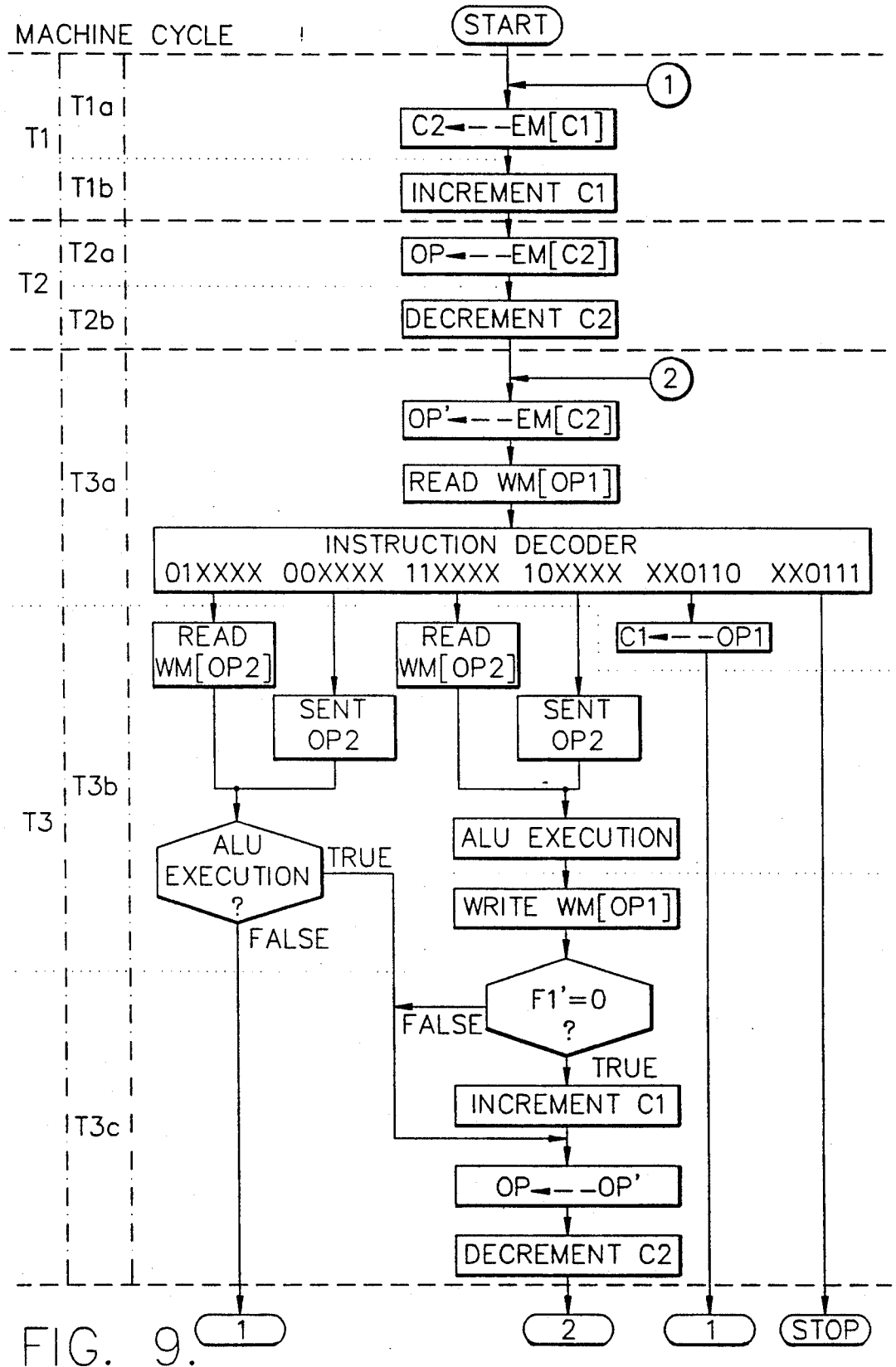
FIG. 9 is a flowchart showing the inferencing flow of the REX chip.

Once Working Memory is loaded with user-input facts, REX will start the inferencing process from the first rule in External Memory. The inferencing flow of REX is shown in FIG. 9.

There are 3 different machine cycles for REX in inferencing Mode.

T1 Cycle: T1 is Rule Fetch Cycle. T1 cycle is executed only at the very beginning of the inferencing process or when JMP instruction occurs. T1 cycle fetches the starting address of a rule in External Memory to C1 register. C1 is actually a Rule counter, which points the starting address of currently inferenced rule.

Cycle: T2 is Instruction Fetch Cycle T2 cycle fetches the first Condition Instruction of each rule to REX registers. T2 cycle is executed when one of the conditions of a rule is false and the execution starts from the first instruction of the next rule. C2 can be regarded as an Instruction counter points to a Condition Instruction or an Action Instruction which is currently executed in ALU.

T3 Cycle: T3 cycle is Instruction Execution Cycle. There are several cases of the T3 cycle:
Condition Instruction/Immediate Data
Condition Instruction/Direct Addressing
Action Instruction/Immediate Data
Action Instruction/Direct Addressing
JMP
STOP (End of Rule)

The instruction prefetch cycle is overlapped with T3 cycle. If a JMP instruction occurs, execution sequence will go to T1 cycle. If the result of a Condition Instruction is false, the execution sequence will go to T2 cycle. If no JMP instruction and no false condition occurs, REX will use the prefetch data then go to T3 cycle.

REX will go through the same process over and over again, until all the rules in External Memory are inferenced. When inferencing process stopped, SI flag is reset to "0". Then REX switches from Inferencing Mode to I/O Mode.

Timing Chart

Figure 10:
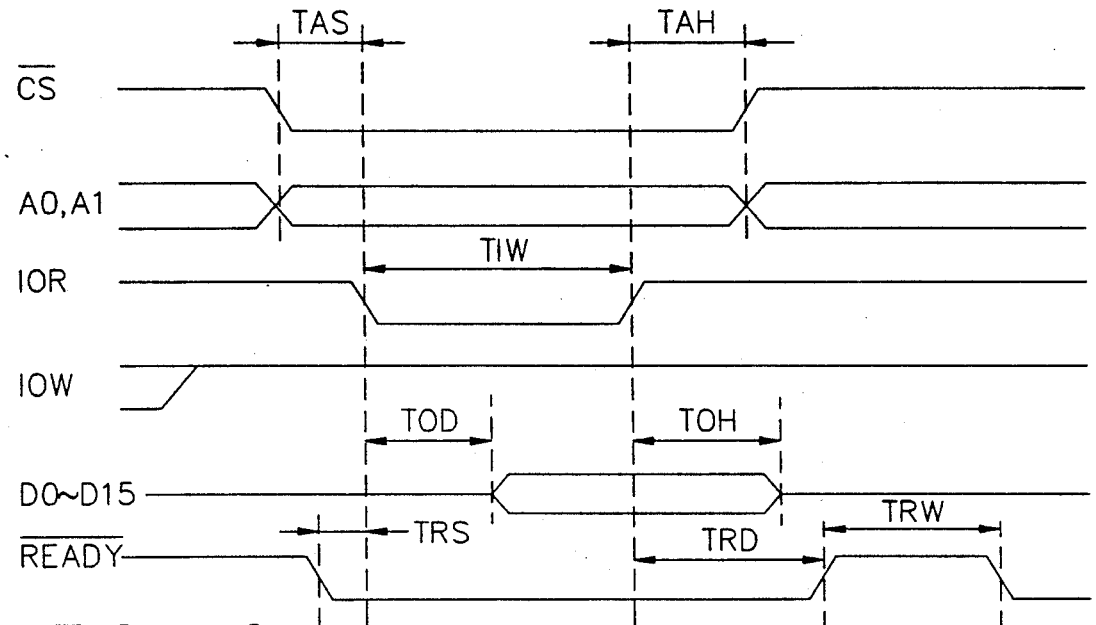
FIGS. 10 to 12 are timing charts for the REX chip showing the timing of the read mode, write mode, and external memory respectively.
Figure 11:
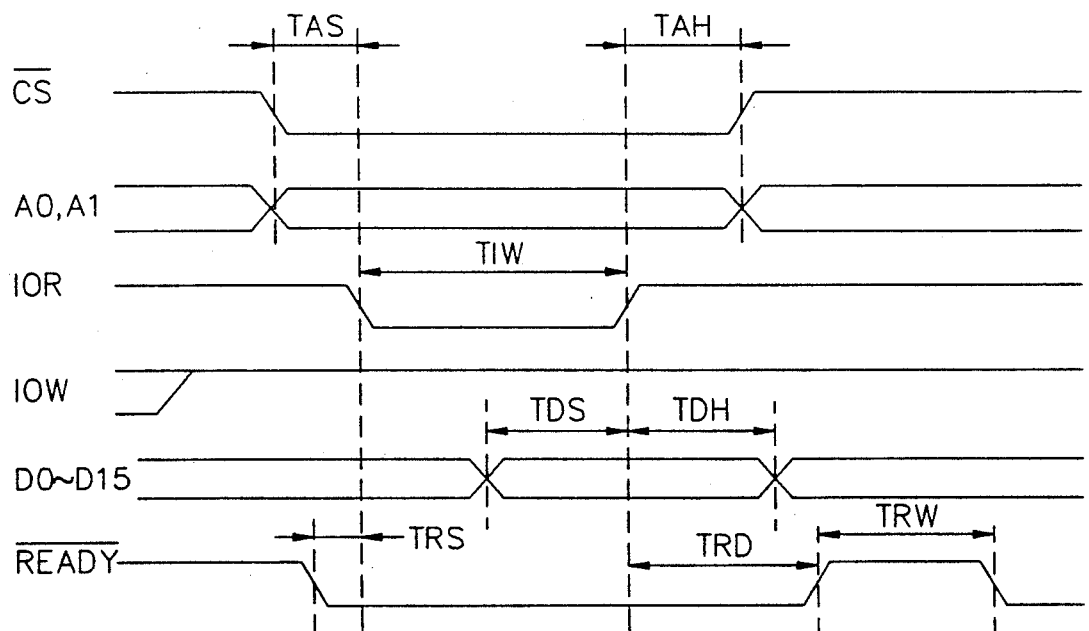
Figure 12:
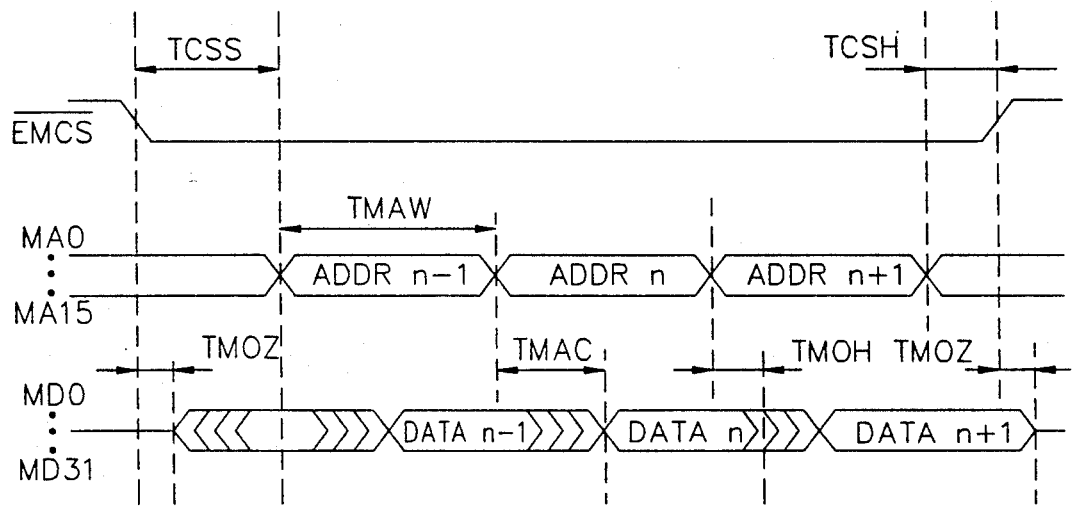

The timing charts for REX in the I/O Read Mode, the I/O Write Mode, and for external rule memory are shown in FIGS. 10-12 respectively. The A.C. (Alternating Current) characteristics of REX in I/O Mode is listed in Table 4.

TABLE 4

| A.C. SPECIFICATION | | | | | |
|---|---|---|---|---|---|
| Symbol | Parameter | Min | Typ | Max | Unit |
| TAS | I/O Address Setup Time | 20 | — | — | ns |
| TAH | I/O Address Hold Time | 10 | — | — | ns |
| TTW | I/O Read/Write Signal Width | 60 | — | — | ns |
| TOD | Data Output Delay Time | — | — | 40 | ns |
| TOH | Data Output Hold Time | 10 | — | — | ns |
| TDS | Data Setup Time | 20 | — | — | ns |
| TDH | Data Hold Time | 10 | — | — | ns |
| TRS | READY Signal Setup | 0 | — | — | ns |

TABLE 4-continued

| A.C. SPECIFICATION | | | | | |
|---|---|---|---|---|---|
| Symbol | Parameter | Min | Typ | Max | Unit |
| TRD | READY Signal Delay Time | 0 | — | CLK*1 | ns |
| TRW | READY Signal Width | CLK-10 | CLK*1 | CLK+10 | ns |
| TMAW | External Memory Address Signal Width | CLK*2−20 | CLK*2 | CLK*2+20 | ns |
| TMAC | External Memory Address Access Time | — | — | 170 | ns |
| TMOH | External Memory Data Output Hold Time | 0 | — | — | ns |
| TCSS | External Memory Chip Select Setup Time | 0 | — | — | ns |
| TCSH | External Memory Chip Select Hold Time | 0 | — | — | ns |
| TMOZ | External Memory Output Floating | — | 20 | — | ns |

CLK is one cycle time of REX internal clock.

GLOSSARY

Antecedent: The *if* part of a production rule.

Application Domain: The subject or field to which the expert system pertains.

Application Rule: Set A set of rules, which are extracted by a knowledge engineer, pertaining to a specific application domain.

ASIC: Application Specific Integrated Circuit is a custom-designed integrated circuit for a specific application.

Consequent: The *then* part of a production rule.

CPU: Central Processing Unit: An operational unit which processes instructions and data.

Co-processor: A specialized processor which cooperates with a host computer to enhance the performance of the entire system.

Control Logic: A custom circuit that controls all the operations necessary for the REX chip.

DMA: Direct Memory Access: A commonly used communication method between a host computer and computer peripheral devices. DMA provides the most efficient way to transfer a block of data.

External Data: A block of binary data resides in a host computer memory.

External Memory: A physical memory which stores Application Rule Set.

Fact: A truth known by actual experience or observation. A group of facts are collected to combat conjectures.

Inferencing: Interpreting a rule of Application Rule Set.

Inference Engine: A problem-solving control mechanism for an expert system.

I/O Interface: A kind of device driver responsible for the communication between the computer host system and computer peripheral devices.

Knowledge Engineer: A person who extracts knowledge and facts of a particular application domain and converts them into Application Rule Set.

PC: Personal Computer.

PC/DOS: The Disk Operating System of Personal Computer, which managers the read/Write operations of a disk driver.

Production Rule: A rule specified in an *if-then* format.

RAM: Random-Access Memory: An electronic memory stores binary information which can be read-or-write-accessed.

ROM: Read-Only Memory: An electronic memory storage which stores the binary information. A ROM is read-accessed only; it does not have a write capability.

Rule Base Structure: An organization which stores the production rules in an efficient way to save the memory space and processing time.

Working Memory: A RAM that resides in the store the initial, intermediate, and final data of an inferencing process.

User Interface: A software program responsible for the communication between the end-users and the computer host system.

| APPENDIX A |
|---|
| Example of Animal Identification Rule Set |

RULE 1
IF
    (covering = hair)
THEN
    (class = mammal).

RULE 2
IF
    (produce = milk)
THEN
    (class = mammal).

RULE 3
IF
    (covering = feathers)
THEN
    (class = bird).

RULE 4
    (movement = fly) and
    (produce = eggs)
THEN
    (class = bird).

RULE 5
IF
    (food = meat)
THEN
    (carnivore = yes).

RULE 6
IF
    (teeth = pointed) and
    (limb) = claws) and
    (eyes = forward)
THEN
    (carvivore = yes).

RULE 7
IF
    (class = mammal) and
    (limbs = hoofs)
THEN
    (type = ungulate).

RULE 8
IF
    (class = mammal) and

APPENDIX A
Example of Animal Identification Rule Set

```
            (food = cud)
     THEN
            (type = ungulate) and
            (toed = even).
RULE 9
  IF
            (class = mammal) and
            (type = carnivore) and
            (color = tawny) and
            (spots = dark)
     THEN
            (animal = cheetah).
RULE 10
  IF
            (class = mammal) and
            (type = carnivore) and
            (color = tawny) and
            (stripes = black)
     THEN
            (animal = tiger).
RULE 11
  IF
            (type = ungulate) and
            (neck = long) and
            (legs = long) and
            (spots = dark)
     THEN
            (animal = giraffe).
RULE 12
  IF
            (type = ungualte) and
            (stripes = zebra).
     THEN
            (animal = zebra).
RULE 13
  IF
            (class = bird) and
            (movement <> fly) and
            (neck = long) and
            (legs = long) and
            (color = black_and_white)
     THEN
            (animal = ostrich).
RULE 14
  IF
            (class = bird) and
            (movement <> fly) and
            (swims = yes) and
            (color = black_and_white)
     THEN
            (animal = penquin).
RULE 15
  IF
            (class = bird) and
            (movement = flies_well)
     THEN
            (animal = albatross).
```

That we which claim is:

1. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed, and for storing the deduced new facts in said memory means;

host computer means communicatively connected to said working memory means, for providing the facts pertaining to the application domain to said working memory means and for accepting the deduced new facts from said working memory means; and wherein each of the instructions of said rule set includes an operator, a condition/action flag, and a pair of operands; and wherein said logic means includes an instruction decoder for testing said condition/action flag to determine whether the instruction is a condition or an action; means operable if the instruction is a condition for comparing the operands in accordance with the logical operation specified by the operator to generate a logic result; and means operable if the instruction is an action for performing the action specified by the operator on the operands.

2. The system of claim 1 wherein said logic means includes means operable if the logic result of said comparing means is TRUE for effecting fetching of the next instruction of the same rule.

3. The system of claim 1 wherein said logic means includes means operable if the logic result of said comparing means is FALSE for effecting fetching of the first instruction of the next rule.

4. The system of claim 1 wherein each of said instructions also includes a direct/immediate flag for specifying the addressing mode of one of the operands.

5. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed, and for storing the deduced new facts in said memory means;

host computer means communicatively connected to said working memory means, for providing the facts pertaining to the application domain to said working memory means and for accepting the deduced new facts from said working memory means; and wherein at least one of said instructions of each rule represents a condition to be satisfied by the facts of a given problem and including:
(i) an operation code defining a logical operation to be performed;
(ii) a first operand defining a first value to be compared by said logical operation; and
(iii) a second operand defining the address in said working memory containing a second value to be compared by said logical operation.

6. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed, and for storing the deduced new facts in said memory means;

host computer means communicatively connected to said working memory means, for providing the facts pertaining to the application domain to said working memory means and for accepting the deduced new facts from said working memory means; and wherein said rule set comprises a series of instructions in successive memory addresses beginning at one end of said rule memory means, and additionally including means for storing a rule index in successive memory addresses beginning at the opposite end of said rule memory means, the rule index comprising a series of memory addresses defining the beginning memory address of each rule of said rule set.

7. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed, and for storing the deduced new facts in said memory means;

host computer means communicatively connected to said working memory means, for providing the facts pertaining to the application domain to said working memory means and for accepting the deduced new facts from said working memory means; and wherein at least one of said instructions of each rule represents an action to be performed if all of the conditions of the rule are satisfied, and including:
(i) an operation code defining the action to be performed; and
(ii) a first operand defining a value for a fact, and
(iii) a second operand defining the address in said working memory means where the value defined in the first operand is to be stored.

8. The system of claim 7 wherein said means for successively executing instructions in said rule memory means comprises rule memory counter means including an address register for storing the address of the current instruction in said rule memory means; and means for updating said address register with the address of the next instruction each time an instructions fetched from said rule memory means.

9. The system of claim 7 further comprising means for loading the rule set into said rule memory means in forward chaining order; and wherein said logic means successively executes the instructions in said rule memory means to perform forward chaining inferencing upon the loaded rule set, and thereby deduce the new facts at high speed.

10. The system of claim 7 further comprising means for loading the rule set into said rule memory means in backward chaining order; and wherein said logic means successively executes the instruction in said rule memory means to perform backward chaining inferencing upon the loaded rule set, and thereby deduce the new facts at high speed.

11. The system of claim 7 further comprising means for loading the rule set into said rule memory means in combination chaining order; and wherein said logic means successively executes the instructions in said rule memory means to perform combination chaining inferencing upon the loaded rule set, and thereby deduce the new facts at high speed.

12. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed; and wherein at least one of said instructions of each rule represents an action to be performed if all of the conditions of the rule are satisfied, and including:

(i) an operation code defining the action to be performed; and (ii) a first operand defining a value for a fact, and (iii) a second operand defining the address in said working memory where the value defined in the first operand is to be stored.

13. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed; and wherein said rule set is stored as a series of instructions in successive memory addresses beginning at one end of said rule memory means, and additionally includes means for storing a rule index in successive memory addresses beginning at the opposite end of said rule memory means, the rule index comprising a series of memory addresses defining the beginning memory address of each rule of said rule set.

14. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first bidirectional communications bus for communicatively connecting said working memory means and said logic means;

a second unidirectional communications bus for communicatively connecting said rule memory means to said logic means;

said logic means comprising means for successively executing the instructions in said rule memory means obtained via said second communications bus, with reference to the stored facts in working memory means obtained via said first communications bus, to thereby deduce new facts at high speed, for storing the deduced new facts in said working memory means; and an input-output interface means, and a bidirectional input-output interface bus communicatively connecting said working memory means and said input-output interface means, for storing in said working memory from an external system, the facts pertaining to the application domain and for transferring the deduced new facts stored in said working memory to an external system; and wherein at least one of said instructions of each rule represents a condition to be satisfied by the facts of a given problem and including:

(i) an operation code defining a logical operation be performed;

(ii) a first operand defining a first value to be compared by said logical operation; and (iii) a second operand defining the address in said working memory a second value to be compared by said logical operation.

15. A hardware-implemented rule-based expert system apparatus suitable for performing high speed inferencing based upon a rule set for an application domain, comprising:

working memory means for storing therein facts pertaining to the application domain;

rule memory means for storing therein the rule set for the application domain, comprised of a series of instructions each defining a condition or an action;

logic means;

a first communications bus for communicatively connecting said working memory means to said logic means;

a second communications bus for communicatively connecting said rule memory means to said logic means;

said logic means comprising means for successively executing the instructions in said rule memory means obtained via said second communications bus, with reference to the stored facts in said working memory means obtained via said first communications bus, to thereby deduce new facts at high speed; and wherein at least one of said instructions of each rule represent a condition to be satisfied by the facts of a given problem and including:

(i) an operation code defining a logical operation to be performed;

(ii) a first operand defining a first value to be compared by said logical operation; and (iii) a second operand defining the address in said working memory containing a second value to be compared by said logical operation.

16. The system of claim 15 wherein said means for successively executing instructions in said rule memory means comprises rule memory counter means including an address register for storing the address of the current instruction in said rule memory means; and means for updating said address register with the address of the next instruction each time an instruction is fetched form said rule memory means.

17. The system of claim 15 further comprising means for loading the rule set into said rule memory means in forward chaining order; and wherein said logic means successively executes the instructions in said rule memory means to perform forward chaining inferencing upon the loaded rule set, and thereby deduce the new facts at high speed.

18. The system of claim 15 further comprising means for loading the rule set into said rule memory means in backward chaining order; and wherein said logic means successively executes the instructions in said rule memory means to perform backward chaining inferencing upon the loaded rule set, and thereby deduce the new facts at high speed.

19. The system of claim 15 further comprising means for loading the rule set into said rule memory means in combination chaining order; and wherein said logic means successively executes the instructions in said rule memory means to perform combination chaining inferencing upon the loaded rule set, and thereby deduce the new facts at high speed.

20. The system of claim 15 further comprising:
host computer means communicatively connected to said hardware-implemented rule-based expert system, for providing the facts pertaining to the application domain to said working memory means and for accepting the deduced new facts from said hardware-implement rule-based expert system.

21. The system of claim 15 further comprising:
host computer means communicatively connected to said memory means, for providing the facts pertaining to the application domain to said working memory means and for accepting the deduced new facts from said working memory means.

22. A hardware-implemented rule-based expert system apparatus suitable for performing high speed inferencing based upon a rule set for an application domain, comprising:
working memory means for storing therein facts pertaining to the application domain;
rule memory means for storing therein the rule set for the application domain, comprised of a series of instructions each defining a condition or an action;
logic means;
a first bidirectional communications bus for communicatively connecting said working memory means and said logic means;
a second unidirectional communications bus for communicatively connecting said rule memory means to said logic means;
said logic means comprising means for successively executing the instructions in said rule memory means obtained via said second communications bus, with reference to the stored facts in said working memory means obtained via said first communications bus, to thereby deduce new facts at high speed, for storing the deduced new facts in said working memory means;
an input-output interface means, and a bidirectional input-output interface bus communicatively connecting said working memory means and said input-output interface means, for storing in said working memory from an external system, the facts pertaining to the application domain and for transferring the deduced new facts stored in said working memory to an external system; and
wherein at least one of said instructions of each rule represents an action to be performed if all of the conditions of the rule are satisfied, and including:
(i) an operation code defining the action to be performed; and
(ii) a first operand defining a value for a fact, and
(iii) a second operand defining an address in said working memory means where the value defined in the first operand is to be stored.

23. A hardware-implemented rule-based expert system apparatus suitable for performing high speed inferencing based upon a rule set for an application domain, comprising:
working memory means for storing therein facts pertaining to the application domain;
rule memory means for storing therein the rule set for the application domain, comprised of a series of instructions each defining a condition or an action;
logic means;
a first bidirectional communications bus for communicatively connecting said working memory means and said logic means;
a second unidirectional communications bus for communicatively connecting said rule memory means to said logic means;
said logic means comprising means for successively executing the instructions in said rule memory means obtained via said second communications bus, with reference to the stored facts in said working memory means obtained via said first communications bus, to thereby deduce new facts at high speed, for storing the deduced new facts in said working memory means; and
an input-output interface means, and a bidirectional input-output interface bus communicatively connecting said working memory means and said input-output interface means, for storing in said working memory from an external system, the facts pertaining to the application domain and for transferring the deduced new facts storing in said working memory to an external system; and
wherein said rule set is stored as a series of instructions in successive memory addresses beginning at one end of said rule memory means, and additionally includes means for storing a rule index in successive memory addresses beginning at the opposite end of said rule memory means, the rule index comprising a series of memory addresses defining the beginning memory address of each rule of said rule set.

24. A hardware-implemented rule-based expert system apparatus suitable for performing high speed inferencing based upon a rule set for an application domain, comprising:
working memory means for storing therein facts pertaining to the application domain;
rule memory means for storing therein the rule set for the application domain, comprised of a series of instructions each defining a condition or an action;
logic means;
a first bidirectional communications bus for communicatively connecting said working memory means and said logic means;
a second unidirectional communications bus for communicatively connecting said rule memory means to said logic means;
said logic means comprising means for successively executing the instructions in said rule memory means obtained via said second communications bus, with reference to the stored facts in said working memory means obtained via said first communications bus, to thereby deduce new facts at high speed, for storing the deduced new facts in said working memory means;

an input-output interface means, and a bidirectional input-output interface bus communicatively connecting said working memory means and said input-output interface means, for storing in said working memory from an external system, the facts pertaining to the application domain and for transferring the deduced new facts storing in said working memory to an external system; and wherein each of the instructions of said rule set includes an operator, a condition/action flag, and a pair of operands; and wherein said logic means includes an instruction decoder for testing said condition/action flag to determine whether the instruction is a condition or an action; means operable if the instruction is a condition for comparing the operands in accordance with the logical operation specified by the operator to generate a logic result; and means operable if the instruction is an action for performing the action specified by the operator on the operands.

25. The system of claim 24 wherein said logic means includes means operable if the logic result of said comparing means is TRUE for effecting fetching of the next instruction of the same rule.

26. The system of claim 24 wherein said logic means includes means operable if the logic result of said comparing means is FALSE for effecting fetching of the first instruction of the next rule.

27. The system of claim 24 wherein each of said instructions also includes a direct/immediate flag for specifying the addressing mode of one of the operands.

28. The system of claim 24 further comprising means for loading the rule set into said rule memory means in backward chaining order; and wherein said logic means successively executes the instruction in said rule memory means to perform backward chaining inferencing upon the loaded rule set, and thereby deduce the new facts at high speed.

29. The system of claim 24 further comprising means for loading the rule set into said rule memory means in combination chaining order; and wherein said logic means successively executes the instructions in said rule memory means to perform combination chaining inferencing upon the loaded rule set, and thereby deduce the new facts at high speed.

30. The system of claim 24 further comprising:
host computer means communicatively connected to said input-output interface means, for providing the facts pertaining to the application domain to said input-output interface means and for accepting the deduced new facts from said input-output interface means.

31. The system of claim 24 wherein said means for successively executing instructions in said rule memory means comprises rule memory counter means including an address register for storing the address of the current instruction in said rule memory means; and means for updating said address register with the address of the next instruction each time an instruction is fetched from said rule memory means.

32. The system of claim 24 further comprising means for loading the rule set into said rule memory means in forward chaining order; and wherein said logic means successively executes the instructions in said rule memory means to perform forward chaining inferencing upon the loaded rule set, and thereby deduce the new facts at high speed.

33. A hardware-implemented rule-based expert system apparatus suitable for performing high speed inferencing based upon a rule set for an application domain, comprising:
logic means;
working memory means for storing therein facts pertaining to the application domain;
rule memory means for storing therein the rule set for the application domain, comprised of a series of instructions each defining a condition or an action each of the instructions of said rule set including an operator, a condition/action flag, and a pair of operands;
a first communications bus for communicatively connecting said working memory means to said logic means; and
a second communications bus for communicatively connecting said rule memory means to said logic means;
said logic means comprising means for success executing the instructions in said rule memory means obtained via said second communications bus, with reference to the stored facts in said working memory means obtained via said first communications bus, to thereby deduce new facts at high speed; said logic means further comprising an instruction decoder for testing said condition/action flag to determine whether the instruction is a condition or an action; means operable if the instruction is a condition for comparing the operands in accordance with the logical operation specified by the operator to generate a logic result; and means operable if the instruction is an action for performing the action specified by the operator on the operands.

34. The system of claim 33 further comprising:
host computer means communicatively connected to said working memory means, for providing the facts pertaining to the application domain to said working memory means and for accepting the deduced new facts from said working memory means.

35. The system of claim 33 further comprising:
host computer means communicatively connected to said hardware-implement rule-based expert system, for providing the facts pertaining to the application domain to said working memory means and for accepting the deduced new facts from aid hardware-implemented rule-based expert system.

36. The system of claim 33 wherein said means for successively executing instructions in said rule memory means comprises rule memory counter means including an address register for storing the address of the current instruction in said rule memory means; and means for updating said address register with the address of the next instruction each time an instruction is fetched from said rule memory means.

37. The system of claim 36 wherein said logic means further comprises means for storing the deduced new facts in said working memory means; wherein said first communications bus comprises a bidirectional communications bus for loading the facts pertaining to the application domain from said working memory means into said logic means and for storing the new facts deduced by said logic means into said working memory means; and wherein said second communications bus comprises a unidirectional communications bus for loading the instructions defining a condition or an action from said rule memory means into said logic means.

38. The system of claim 33 wherein said logic means further comprises means for storing the deduced new facts in said working memory means; and wherein said system further comprises output means for transferring the deduced new facts stored in said working memory to an output device.

39. The system of claim 38 wherein said output means comprises an input-output interface and an input-output interface bus communicatively interconnecting said input-output interface to said working memory means.

40. The system of claim 33 wherein said rule set is stored as a series of instructions in successive memory addresses beginning at one end of said rule memory means, and additionally includes means for storing a rule index in successive memory addresses beginning at the opposite end of said rule memory means, the rule index comprising a series of memory addresses defining the beginning memory address of each rule of said rule set.

41. The system of claim 33 wherein said logic means includes mean operable if the logic result of said comparing means is TRUE for effecting fetching of the next instruction of the same rule.

42. The system of claim 33 wherein said logic means includes means operable if the logic result of said comparing means is FALSE for effecting fetching the first instruction of the next rule.

43. The system of claim 33 wherein each of said instructions also includes a direct/immediate flag for specifying the addressing mode of one of the operands.

44. The system of claim 33 further comprising means for loading the rule set for the application domain into said rule memory means.

45. The system of claim 44 wherein said means for loading the rule set for the application domain into said rule memory means comprises means for loading the rule set into said rule memory means in combination chaining order; and wherein said logic means successively executes the instructions in said rule memory means to perform combination chaining inferencing upon the loaded rule set, and thereby deduce the new facts at high speed.

46. The system of claim 44 wherein said means for loading the rule set for the application domain into said rule memory means comprises means for loading the rule set into said rule memory means in forward chaining order; and wherein said logic means successively executes the instructions in said rule memory means to perform forward chaining inferencing upon the loaded rule set, and thereby deduce the new facts at high speed.

47. The system of claim 44 wherein said means for loading the rule set for the application domain into said rule memory means comprises means for loading the rule set into said rule memory means in backward chaining order; and wherein said logic means successively executes the instructions in said rule memory means to perform backward chaining inferencing upon the loaded rule set, and thereby deduce the new facts at high speed.

* * * * *